April 19, 1938. L. H. GRISELL 2,114,489
SHAFT SEALING DEVICE
Filed Aug. 3, 1935
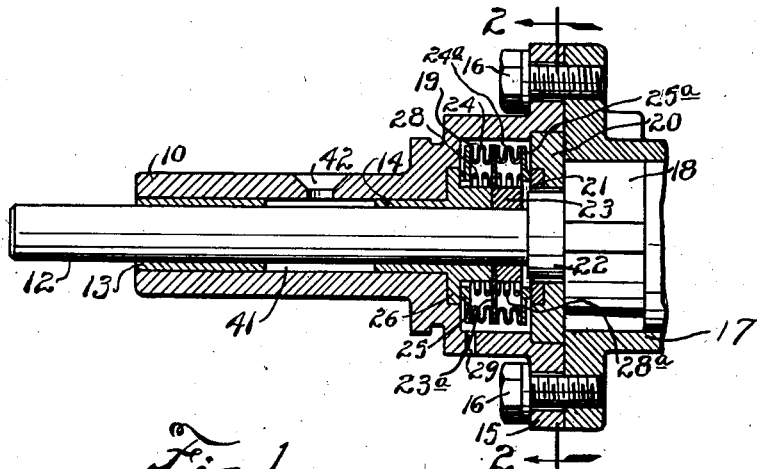
Fig. 1
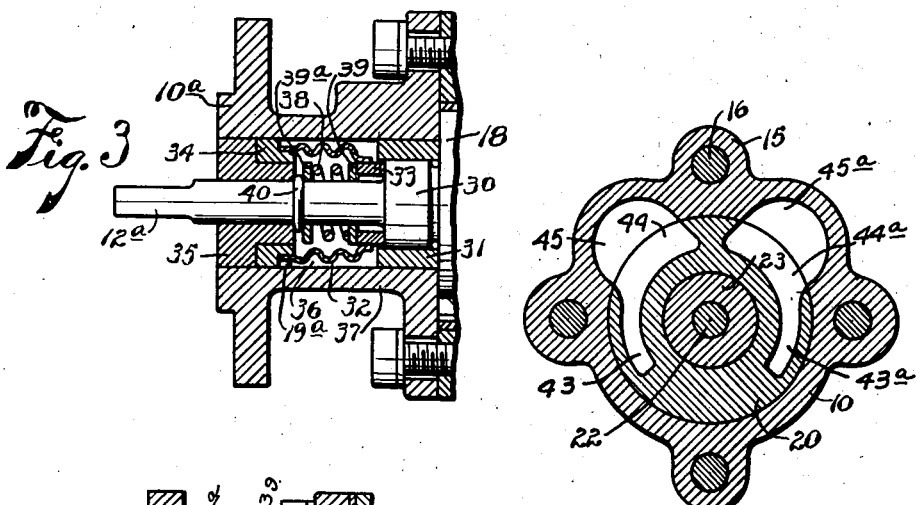
Fig. 3
Fig. 2
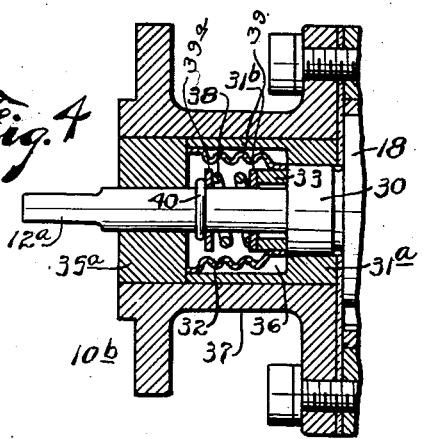
Fig. 4
INVENTOR.
LOWELL H. GRISELL
BY Joseph Farley
ATTORNEY.

Patented Apr. 19, 1938

2,114,489

UNITED STATES PATENT OFFICE 2,114,489

SHAFT SEALING DEVICE

Lowell Hobart Grisell, Highland Park, Mich.

Application August 3, 1935, Serial No. 34,533

9 Claims. (Cl. 286—11)

The present invention relates to shaft sealing devices which although especially designed and particularly adapted for sealing the shaft of fuel pumps of the type used in combination with internal combustion engines, are capable of use with many different types of devices. Although it has now become the almost universal practice to employ fuel pumps in place of vacuum feed systems in the automotive industry, as well as for marine and aviation engines of the internal combustion type, the adoption of such pumps has resulted in the introduction of a very difficult problem in connection with the automatic sealing of the pump driving shaft so as to prevent leakage of gasoline from the working chamber of the pump about the said driving shaft. Many efforts have been made to provide an effective sealing means for such pump shafts, among them being the use of cork and soft metal gaskets and other packings. It has been found, however, that such devices become worn after a relatively short period of use with resultant seepage or leakage of gasoline, which not only constitutes a serious fire hazard, but also results in dilution of the crank case oil with consequent rapid wear of bearings, pistons, piston rings and other parts of the motor.

The present application, as to certain modifications herein disclosed, is a continuation in part of my co-pending application, Serial No. 680,797, filed July 17, 1933, now Patent No. 2,037,894, issued April 21, 1936, wherein is disclosed a pump particularly adapted for use as a fuel pump for internal combustion engines, although being capable of use in other relations, and which pump is shown in such application as being provided with shaft sealing means of the metal sylphon type. The use of such metal sylphons while not broadly new, overcomes the objection to the use of the soft packings above referred to, as such sylphons are not subject to deteriorations when exposed to the action of gasoline or oil. Although many attempts have been made to devise a satisfactory metal sylphon type of shaft sealing means for fuel pumps, among which may be noted the use of floating and divided shafts, considerable difficulty has been experienced even with this type of shaft sealing means because of resulting unbalanced end pressures, loss of end seal and other difficulties. Moreover, in the prior constructions many complications, from the standpoint of the manufacturing and assembling operations, were introduced with resultant increase of production and maintenance costs. It is highly important, particularly in the automotive industry, that such costs be kept as low as possible while at the same time producing a product that will operate with high efficiency over long periods of time without requiring frequent inspection and service.

In connection with fuel pumps for internal combustion engines it is also of the utmost importance, not only that seepage or leakage of gasoline from the working chamber of the pump to the exterior, with the resultant fire hazard, be prevented, but also it is important that seepage or leakage of oil from the bearings of the pump driving shaft into the working chamber of the pump be prevented.

The principal object of the present invention is to provide a shaft sealing means particularly adapted for use with a fuel pump for an internal combustion engine, in which the difficulties above referred to will be overcome.

Another object of the present invention is to provide a construction of a shaft sealing means adapted to be interposed between the working chamber of the pump and the bearings of the pump shaft, said shaft sealing means being of the sylphon type and forming a double seal, one seal for preventing seepage or leakage of gasoline to the shaft bearing and also to the exterior, and the other seal effectively preventing leakage or seepage of oil from the shaft bearings into the interior gasoline containing or working chamber of the pump.

A further object of the invention is to provide a shaft sealing means of the sylphon type so constructed and arranged that the expansible metal bellows, or sylphon, is so connected to the frictional wiping seals, and so related to the shaft bearings and working chamber, that the expansible metal bellows forms a complete barrier having at the ends thereof hermetically sealed joints that absolutely precludes all possibility of the intermingling of oil from the bearings with the gasoline or other fuel and escape of the gasoline to and through the shaft bearings.

Another object of the present invention is to provide a shaft sealing means of the sylphon type so constructed and arranged that there will be absolutely no end thrust upon the pump driving shaft.

A further object is to provide a shaft sealing means of the type referred to, which is of relatively simple and inexpensive construction and capable of being very readily assembled.

The above and other objects of the invention will appear more fully from the following more detailed description and by reference to the accompanying drawing forming a part hereof wherein;

Fig. 1 is a central longitudinal section through a pump showing the driving shaft and shaft sealing means, a portion of the pump casing containing the shaft rotor and working chamber being broken away;

Fig. 2 is a section on the line 2—2 of Fig. 1; and

Figs. 3 and 4 are views similar to Fig. 1, each showing a different and modified construction of the shaft sealing means.

In the form shown in Fig. 1 that portion of the pump casting which contains the bearings for the driving shaft and from which one end of the pump driving shaft projects, is of the type wherein one end of the casting is adapted to project into the crank case of an automobile to be connected to any suitable driving shaft contained therein, whereas in the forms shown in Figs. 3 and 4 the shaft bearing section of the pump casting is provided with an exterior, annular flange, by means of which the pump is bolted to the exterior of the crank case or engine, with the projecting end of the driving shaft extending adjacent to a suitable rotating member of the engine to be driven thereby; it being understood that suitable connecting gears are interposed between the driving shaft of the pump and the rotating member of the engine by which the pump is driven.

As shown in Fig. 1 of the drawing, the numeral 10 indicates the casting member of the pump through which the pump driving shaft 12 projects. The member 10 contains a pair of spaced shaft bearings 13, 14, which constitute the sole bearings for said driving shaft. At its inner end the casting member 10 is provided with an annular projecting flange 15 having suitable apertures therein through which pass the bolts 16 which serve to connect the member 10 to the casting section 17 which forms a housing for, and encloses, the working chamber of the pump in which is mounted the rotor 18. Immediately adjacent to the annular flange 15 the casting 10 is enlarged to form a chamber 19 in which the shaft sealing means, presently to be more fully described, is located. At its inner end the casting 10 is counterbored for the reception of an end plate 20 which is press fitted into the counterbored end of the casting 10. The inner face of the end plate 20 is suitably recessed or countersunk for the reception of a sealing ring 21 and said end plate is provided with a central aperture through which passes a projecting hub or boss 22 integral with the rotor 18, the hub 22 being of slightly smaller diameter than the aperture in the end plate 20 to provide a running clearance between said hub and said end plate. For convenience in manufacturing the inner end of the driving shaft 12 is reduced and said reduced end of the shaft is preferably press fitted into the rotor 18, although the shaft 12 and rotor 18 obviously could be of one-piece construction.

The sylphon sealing means located within the chamber 19 comprises a collar 23 press fitted upon the shaft 12, said collar having a projecting annular flange 23a to which, adjacent its outer periphery, is united, preferably by soldering or brazing, a pair of sylphon sections 24, 24a, the sylphon sections being united to the flange 23a in such a way as to form a hermetical seal entirely around and adjacent to the outer periphery of said flange. The other end of the sylphon section 24 is similarly united by a hermetically sealed joint to a sealing ring 25, which at its inner end is provided with a small projecting rib or flange adapted to contact in wiping sealing engagement with a projecting flange 26 formed integral with the shaft bearing 14. The other end of the sylphon section 24a is also similarly united to a second sealing ring 25a, the construction of which is similar to that of the ring 25 and the projecting rib of the ring 25a being adapted to engage with the sealing ring 21 seated within the end plate 20.

A pair of expansion springs 28 and 28a are interposed respectively between the flange 23a and the sealing ring 25 and said flange and the sealing ring 25a. In order to prevent the accumulation of any gasoline or other liquid being pumped within the chamber 19 in the event that the sealing ring 25a should fail to function properly, a small vent or drain hole 29 leading to atmosphere and communicating with the interior of the chamber 19 is provided, and for the purpose of lubricating the bearings 13, 14, an oil hole 42 is provided midway between the inner adjacent ends of said bearings.

In the form shown in Fig. 3 the casing member 10a, as hereinbefore pointed out, is of the type wherein it is provided with a lateral flange for attachment to a crank case or engine casting of an internal combustion engine, the driving shaft 12a being press fitted into the rotor 18 in the same manner as disclosed in Fig. 1. The sylphon sealing means is contained within a chamber 19a defined by the bore of the casing section 10a and located between a bearing 31 adjacent the rotor 18 and a bearing 35 press fitted in the outer end of the casing section.

As shown in Fig. 3 the sylphon sealing means comprises an expansible metallic bellows like member 32, having its inner end hermetically united by soldering or brazing to a sealing ring 33 and its other end similarly united to a sealing ring 34 which fits with a sealing press fit within a recess defined by the reduced inner end of the bearing 35 and the bore of the casing section 10a. An expansion spring 38 encircles the shaft 12a within the chamber 19a and has one end in abutting relationship with a washer 39 interposed between the spring and the sealing ring 33, while the other end of the spring 38 abuts against a similar washer 39a provided between said other end of the spring 38 and a split abutment ring 40 seated within a suitable groove formed in shaft 12a.

In the form shown in Fig. 4 the inner bearing 31a of the shaft 12a is provided with an annular flange 31b which extends into the bore of the casting section 10b and terminates adjacent to the outer bearing 35a for the shaft 12a. A metallic expansible bellows like member 32 with a sealing ring 33 attached thereto similar in construction to the like numbered parts in Fig. 3 is located within the chamber 36 enclosed within the annular flanged portion 31b of the bearing member 31a, the other end of the bellows member 32 being united to the end of the flange 31b adjacent to the bearing 35a by soldering or brazing to form an hermetic seal. The sealing ring 33 is held with a yielding frictional contact against the end of the enlarged portion 30 of the shaft 12a by a spring 38 having one end abutting against a washer 39a and split ring 40 and the other end abutting against a washer 39, all as described in connection with Fig. 3.

In the form of the invention shown in Fig. 1 it will be noted that both of the springs 28, 28a abut against the flange 23a of the collar 23 which is press fitted upon the shaft 12 with the result that the ends of these springs are in effect in contacting engagement with a shaft abutment. At their other ends the springs abut respectively with the sealing rings 25 and 25a which in turn are in frictional contacting sealing engagement with the flange 26 of the bearing 14 and the sealing or packing ring 21 of the end plate 20. As the bearing 14 and end plate 20 are immovable with respect to the casing section 10 and as the springs 28 and 28a are of substantially the same strength, there is a balancing of the spring pressure of the springs so that no effective end thrust is placed upon the shaft 12.

In the modifications shown in Figs. 3 and 4, there is likewise no end thrust produced upon the abutment ring 40 because the pressure of the spring 38 is exerted against the side face of the hub 30 formed integral with the rotor 18 and as the shaft 12 is press fitted into the rotor and the other end of the spring 38 exerts its pressure against the split ring 40, the spring is confined between two spaced abutments on the shaft 12 which abutments are immovable relatively to the shaft.

In each form of the invention it will be noted that the expansion springs have one end in abutting relationship with an abutment that is rigid with respect to the shaft, while the other end of the expansion spring exerts its pressure against, what may be termed, a freely floating, self-adjustable ring, namely, the ring 25a in Fig. 1 and the rings 33 in Figs. 3 and 4, immediately adjacent to the working chamber of the pump in which the rotor 18 performs its pumping function; the rings 25a and 33 forming a frictional seal against the escape or leakage of gasoline.

It will also be noted that in each form of the invention the metallic, expansible bellows member is so arranged and united at its one end to the sealing rings 25a and 33 respectively, and at its other end to the flange 23a of the ring 23 in Fig. 1, to the sealing ring 34 in Fig. 3, and to the flange 31b of the bearing 31a in Fig. 4, that the bellows member forms a complete barrier between the oil lubricated bearing or bearings in each form of the invention and the working chamber of the pump. For example, in Fig. 1 of the drawing no leakage of gasoline from the working chamber of the pump can occur around the outer periphery of the end plate 20 due to the fact that the end plate is press fitted into the casing section 10. Any gasoline leakage would therefore have to occur between the hub, or boss 22 of the rotor and the central aperture provided in the end plate. Such leakage would therefore take place inside of the chamber defined by the bellows section 24a and could not escape except past the frictional seal between the sealing ring 25a and the packing ring 21, the flange 23a of the collar 23 and the hermetic seal between the ends of the sylphon section 24a, said flange 23a and the ring 25a forming an effective barrier against the passage of any of the gasoline outwardly of the shaft 12a. No leakage of oil could occur into the working chamber of the pump from the bearings 13, 14 because the flanged collar 23 is press fitted into the shaft 12 and any oil which might tend to work inwardly towards the working chamber of the pump between the bearing 14 and the driving shaft 12 would be obstructed by the barrier formed by the flange 23a, the sylphon section 24 and the sealing ring 25.

By referring to Figs. 3 and 4 it will be seen that any leakage of gasoline from the pump chamber would of necessity find its only path of escape exteriorly of the sealing rings 33 and sylphon or bellows sections 32, while any leakage of oil between the bearings 35, 35a and the shafts 12a would find its only path interiorly of the sylphon members 32 and sealing rings 33.

In the form shown in Fig. 1 of the drawing, which is the preferred form of the invention, both of the bearings 13, 14 are oil lubricated bearings and the sylphon sealing means is located in a chamber interposed between said bearings and the working chamber of the pump, while in Figs. 3 and 4, although a bearing is provided for the hub 30 of the rotor 18 by the bearing members 31 and 31a, these bearings 31 and 31a are not oil lubricated bearings but are constructed of suitable material to operate effectively by gasoline lubrication. In both Figs. 3 and 4 the bearings 35 and 35a are oil lubricated and in these modifications the sylphon sealing means is located in a chamber interposed between the oil lubricated bearings and the working chamber of the pump.

In all three forms of the invention the assembly of the shaft sealing means is exceedingly simple, the sealing means being placed upon the driving shaft of the pump in full assembled condition and the pump shaft with the sealing means assembled thereon is merely slid longitudinally into the end of the casing sections 10, or 10a as the case may be. The parts which comprise the rotor or impeller of the pump in the form of sliding vanes, as disclosed in the copending application above referred to, are then placed in proper position in the rotor 18 and the casing section 17 secured to the casing sections 10 or 10a by bolts 16 in a manner which will be readily understood.

It will be noted in all forms of the invention that there is an appreciable clearance between the central aperture of the sealing rings, the sealing rings 25 and 33 respectively and the parts which they surround, so that said rings may have sufficient lateral movement relatively to the axis of rotation of the shaft to be self adjusting under the pressure of the expansion springs which serve to hold them in sealing frictional engagement with the respective abutments against which they are engaged. It will also be noted in the form shown in Fig. 1 that the entire sylphon sealing device rotates with the driving shaft of the pump and the sealing flanges of the rings engage with a rotary wiping contact against fixed abutments carried by the pump casing, whereas in Figs. 3 and 4 the sylphon sealing device is held against rotation but the sealing rings 33 are held with a rotary wiping contact against the rotating fixed abutments 30 of the pump rotor 18. In each case, however, there is provided a relative movement of rotation between the sylphon sealing rings and the portion with which they are in frictional sealing engagement.

As will be seen from the foregoing in all forms of the invention disclosed the use of floating or divided shafts has been avoided. Likewise there are no unbalanced thrusts or end pressures exerted by the expansible sealing means on the pump shaft, consequently there is no tendency for the sealing means to cause loss of end seal between the pump rotor and its working chamber and the attendant difficulties in providing the proper operating end clearances in order to avoid undue wear are thus eliminated.

It will be understood that while in the foregoing description I have referred to leakage of gasoline from the working chamber of the pump, the term "gasoline" has merely been employed for convenience of description and that the invention is not to be construed as limited in its application to a pump for gasoline only but that it is intended to cover the invention for all uses to which it may be applicable.

While I have shown various constructional examples of a shaft sealing means embodying the principles of the present invention it will be understood that many changes, variations and modifications may be resorted to without departing from such principles.

I claim:

1. In a shaft sealing means for a pump having a working chamber and a driving shaft projecting exteriorly of said chamber and mounted at one end in an oil lubricated bearing forming a main pump shaft bearing, a metallic expansible shaft sealing device interposed between said oil lubricated bearing and said working chamber, and comprising a sealing ring having free lateral and axial movement relatively to said shaft, an abutment between said sealing ring and the working chamber of the pump, a second abutment surrounding and concentrically spaced from the end of said bearing, a fixed abutment on said driving shaft, an expansion spring confined between said fixed abutment and said sealing ring to hold the latter with a yielding frictional contact against said first named abutment and an expansible metallic bellows having one end thereof connected with a hermetic seal to said sealing ring and its other end in sealed relationship with said second abutment thereby to form a sealed barrier between said bearing and compartment.

2. In a shaft sealing means for a pump having a working chamber and a driving shaft projecting exteriorly of said chamber and mounted at one end in an oil lubricated bearing forming a main pump shaft bearing, means defining an annular chamber surrounding said shaft and located between said working chamber and said bearing, a metallic expansible shaft sealing device mounted within said annular chamber and comprising an expansible metal bellows-like member, a sealing ring hermetically sealed to one end of said member, an abutment at one end of said annular chamber against which said sealing ring engages, a second abutment at the other end of said annular chamber, sealing means at the other end of said bellows member for engaging said second abutment, means fixed to said driving shaft and immovable longitudinally thereof and expansible resilient means interposed between said fixed means and said sealing means for normally holding said bellows member in expanded condition with said sealing ring and sealing means in engagement with said abutments without exerting end thrust on said shaft, said sealing ring, sealing means and expansible member forming a barrier between said oil lubricated bearing and the working chamber of said pump.

3. In a shaft sealing means for a pump having a working chamber and a driving shaft projecting exteriorly of said chamber and mounted at one end in an oil lubricated bearing forming a main pump shaft bearing, means including a pair of abutments defining a closed chamber surrounding said driving shaft and interposed between said oil lubricated bearing and said working chamber of said pump, an expansible metallic device mounted within said chamber forming a barrier between said working chamber and said oil lubricated bearing and comprising an expansible metallic bellows, a pair of sealing rings secured to the ends of said bellows, a shaft abutment, expansible spring means confined between said shaft abutment and said sealing rings, one of said sealing rings forming a seal against leakage of fluid from said working chamber and the other of said rings forming a seal against leakage of oil from said bearing to said working chamber.

4. A shaft sealing device for a pump having a working compartment with a rotor therein and a rotary driving shaft projecting from said chamber, a casing through which said shaft extends having a chamber adjacent said compartment, a pair of apertured end walls for said chamber fixed within said casing, a metallic expansible bellows in said chamber surrounding said shaft, a flanged collar fixed on said shaft and having its flanged portion united by a hermetic seal to said bellows substantially midway of the latter, a pair of sealing rings hermetically sealed to the ends of said bellows and resilient means confined between said flange and said rings to urge the latter with a frictional sealing engagement into contact with said abutments.

5. A shaft sealing device for a pump having a working compartment with a rotor therein and a rotary driving shaft projecting from said chamber, a casing having a pair of oil lubricated bearings forming the entire bearing surface for said shaft and a chamber located between said bearings and compartment, a pair of apertured end walls for said chamber fixed within said casing, a metallic expansible bellows in said chamber surrounding said shaft, a flanged collar fixed on said shaft and having its flanged portion united by a hermetic seal to said bellows substantially midway of the latter, a pair of sealing rings hermetically sealed to the ends of said bellows and resilient means confined between said flange and said rings to urge the latter with a frictional sealing engagement into contact with said abutments.

6. A shaft sealing device for a pump having a working compartment with a rotor therein and a rotary driving shaft projecting from said chamber, a casing having a pair of oil lubricated bearings forming the entire bearing surface for said shaft and a chamber located between said bearings and compartment, a pair of apertured end walls for said chamber fixed within said casing, a metallic expansible bellows in said chamber surrounding said shaft, a flanged collar fixed on said shaft and having its flanged portion united by a hermetic seal to said bellows substantially midway of the latter, a pair of sealing rings hermetically sealed to the ends of said bellows, resilient means confined between said flange and said rings to urge the latter with a frictional sealing engagement into contact with said abutments, each of said sealing rings having a clearance space at the center thereof to permit limited lateral movement thereof to insure automatic adjustment of said rings to said abutments under the influence of said resilient means.

7. In a pump shaft sealing means, a rotating drive shaft, an oil lubricated bearing forming a main pump shaft bearing, a pump housing having a working chamber and an annular chamber between said bearing and working chamber, an expansible bellows in said annular chamber having an end thereof so sealed as to complete one end of a barrier between said oil lubricated bearing and said working chamber and surrounding a projecting end of said oil lubricated bearing, a fixed abutment on said shaft for rotation against said projecting end of said oil lubricated bearing, a sealing ring sealed upon the opposite end of said expansible bellows, a second abutment concentric with said shaft and located between said shaft abutment and said working chamber, a spring having one end reacting against said shaft abutment and the opposite end urging said sealing ring against said second abutment thereby to hold said expansible bellows as a barrier between said oil lubricated bearing and said working chamber.

8. In a shaft sealing means, a housing having a working chamber and an oil lubricated bearing spaced from said chamber, a shaft rotatable in said housing but held against axial movement relatively thereto, an abutment on said shaft adjacent said working chamber, said housing having an annular chamber surrounding said shaft between said working chamber and bearing, a metallic expansible bellows within said annular chamber, a sealing ring hermetically united to one end of said bellows, a split abutment ring detachably secured to said shaft, an expansible spring confined between said split ring and sealing ring and holding the latter in frictional sealing contact with said abutment and means fixed within said housing to which the other end of said bellows is united with a hermetic seal, said means being in sealed abutting relationship with said bearing.

9. A shaft sealing device for a pump having a working compartment with a rotor therein and a rotary driving shaft projecting from said chamber, a casing member through which one end of said shaft projects provided with oil lubricated bearing surfaces one portion of which is located closely adjacent to but spaced from said working compartment and another portion of which surrounds said shaft adjacent to its projecting end, said surfaces forming the entire bearing for said shaft, a pair of apertured end walls in spaced relation longitudinally of said shaft defining with a portion of said casing member, a chamber located between said working compartment and said bearing surface, a metallic expansible bellows in said chamber surrounding said shaft, a flanged collar fixed on said shaft and having its flanged portion united by a hermetic seal to said bellows substantially midway of the latter, a pair of sealing rings hermetically sealed to the ends of said bellows, resilient means confined between said flange and said rings to urge the latter with a frictional sealing engagement into contact with said abutments, each of said sealing rings having a clearance space at the center thereof to permit limited lateral movement thereof to insure automatic adjustment of said rings to said abutments under the influence of said resilient means.

LOWELL HOBART GRISELL.